(12) United States Patent
Castillo et al.

(10) Patent No.: US 11,223,223 B2
(45) Date of Patent: *Jan. 11, 2022

(54) TRANSPORT AND/OR STORAGE CONTAINER FOR RECHARGEABLE WIRELESS EARPHONES

(71) Applicant: Sennheiser electronic GmbH & Co. KG, Wedemark (DE)

(72) Inventors: Armando Castillo, Singapore (SG); Sven Wilhelmsen, Singapore (SG)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 174 days.

This patent is subject to a terminal disclaimer.

(21) Appl. No.: 16/415,524

(22) Filed: May 17, 2019

(65) Prior Publication Data

US 2019/0288543 A1  Sep. 19, 2019

Related U.S. Application Data

(63) Continuation of application No. 15/295,757, filed on Oct. 17, 2016, now Pat. No. 10,476,292, which is a
(Continued)

(30) Foreign Application Priority Data

Jun. 22, 2009  (DE) ..................... 102 009 030 070.8

(51) Int. Cl.
| | |
|---|---|
| *H02J 7/02* | (2016.01) |
| *H04R 1/10* | (2006.01) |
| *H02J 7/34* | (2006.01) |
| *H02J 7/00* | (2006.01) |

(52) U.S. Cl.
CPC ............ *H02J 7/025* (2013.01); *H02J 7/0044* (2013.01); *H02J 7/0045* (2013.01); *H02J 7/342* (2020.01);
(Continued)

(58) Field of Classification Search
CPC .......... H02J 7/025; H02J 7/342; H02J 7/0045; H02J 7/0044; H04B 5/0037; G06F 3/016
(Continued)

(56) References Cited

U.S. PATENT DOCUMENTS

| | | |
|---|---|---|
| 5,253,300 A | 10/1993 | Knapp |
| 5,590,417 A | 12/1996 | Rudbeck |

(Continued)

FOREIGN PATENT DOCUMENTS

| | | |
|---|---|---|
| DE | 4310873 | 10/1994 |
| DE | 4494132 | 4/2006 |
| GB | 2405269 | 2/2005 |

*Primary Examiner* — Richard V Muralidar
(74) *Attorney, Agent, or Firm* — Haug Partners LLP

(57) ABSTRACT

A transport and/or storage container with integrated charging function for rechargeable wireless earphones comprising a container housing, at least one receiving unit for at least partially receiving a rechargeable wireless earphone, and an electrical container charging contact for connecting the transport and/or storage container to an electrical energy source, wherein the receiving unit has an electrical coupling contact cooperating with an electrical earphone charging contact of a rechargeable wireless earphone when it is placed in the receiving unit for recharging and wherein the electrical container charging contact and the electrical coupling contact are in the form of mutually complementary electrical contacts.

9 Claims, 15 Drawing Sheets

Related U.S. Application Data continuation of application No. 14/666,071, filed on Mar. 23, 2015, now Pat. No. 9,502,913, which is a continuation of application No. 12/459,466, filed on Jun. 30, 2009, now Pat. No. 9,013,145.

(52) U.S. Cl.
CPC ........... *H04R 1/105* (2013.01); *H04R 1/1025* (2013.01); *H02J 2207/40* (2020.01); *H04R 1/1016* (2013.01); *H04R 2420/07* (2013.01)

(58) Field of Classification Search
USPC .................................................. 320/115, 108
See application file for complete search history.

(56) References Cited

U.S. PATENT DOCUMENTS

| | | | |
|---|---|---|---|
| 6,978,163 B2 | 12/2005 | Dyer et al. | |
| 7,548,040 B2 * | 6/2009 | Lee | H04R 1/1025 320/108 |
| 7,825,626 B2 * | 11/2010 | Kozisek | H04M 1/0258 320/114 |
| 7,855,529 B2 * | 12/2010 | Liu | H02J 7/025 320/108 |
| 8,115,451 B2 * | 2/2012 | Griffin, Jr. | H02J 7/0044 320/115 |
| 8,170,623 B2 * | 5/2012 | Dorogusker | H02J 7/342 455/573 |
| 9,013,145 B2 * | 4/2015 | Castillo | H04R 1/1025 320/115 |
| 9,502,913 B2 * | 11/2016 | Castillo | H02J 7/0045 |
| 10,476,292 B2 * | 11/2019 | Castillo | H02J 7/0044 |
| 2004/0090773 A1 | 5/2004 | Bryan | |
| 2005/0140331 A1 | 6/2005 | McQuade | |
| 2005/0212479 A1 | 9/2005 | Tsunoda | |
| 2006/0226805 A1 | 10/2006 | Yu | |
| 2008/0119241 A1 | 5/2008 | Drogusker et al. | |
| 2010/0320961 A1 | 12/2010 | Castillo et al. | |
| 2015/0200558 A1 | 7/2015 | Castillo et al. | |

* cited by examiner

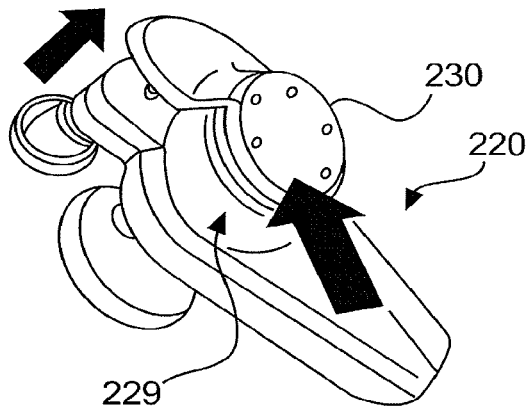
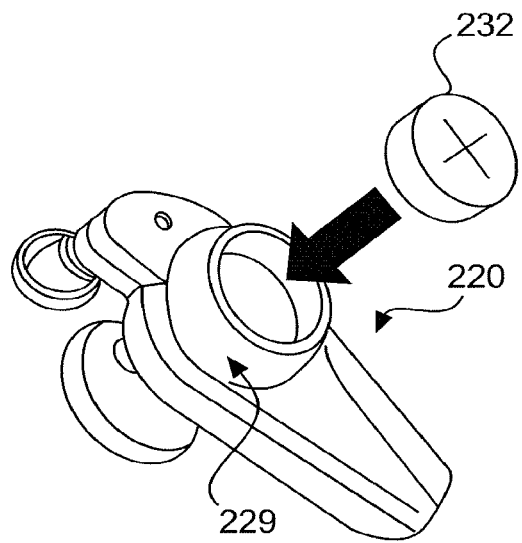
Fig. 8A    Fig. 8B
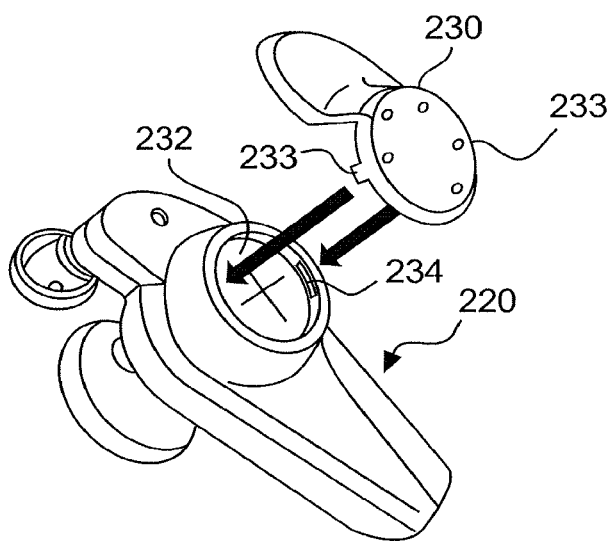
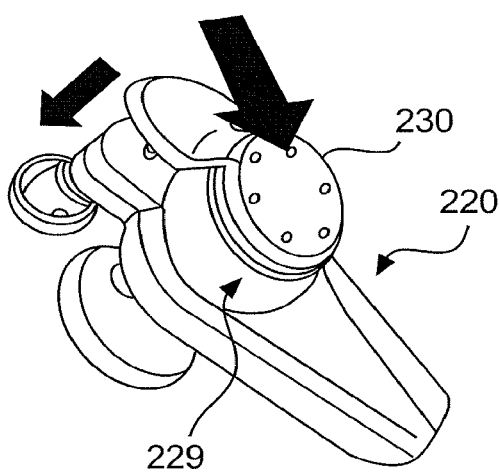
Fig. 8C    Fig. 8D

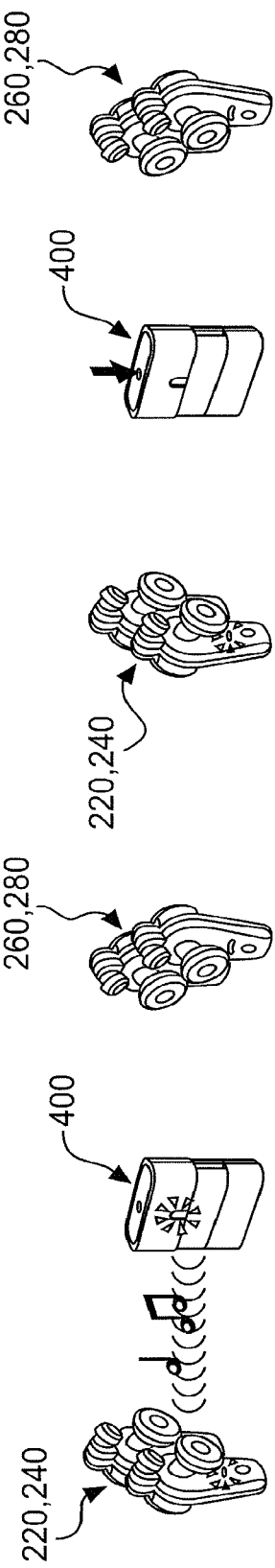
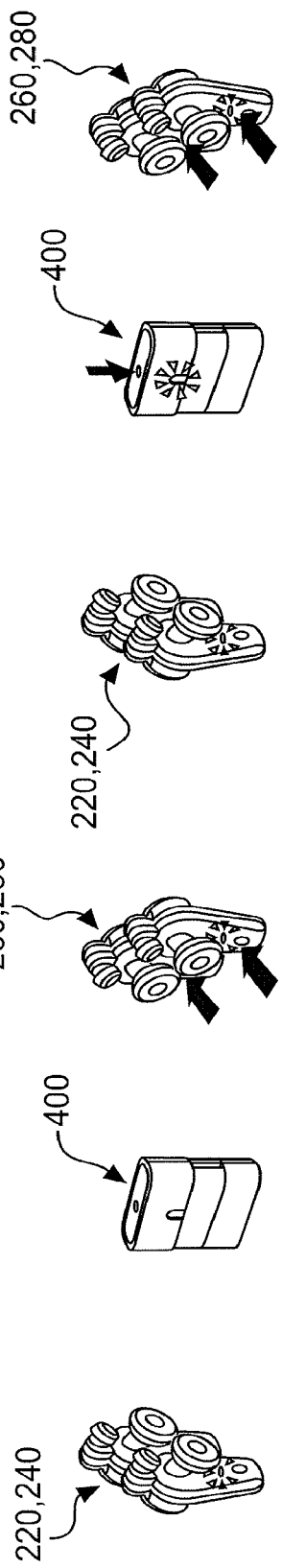
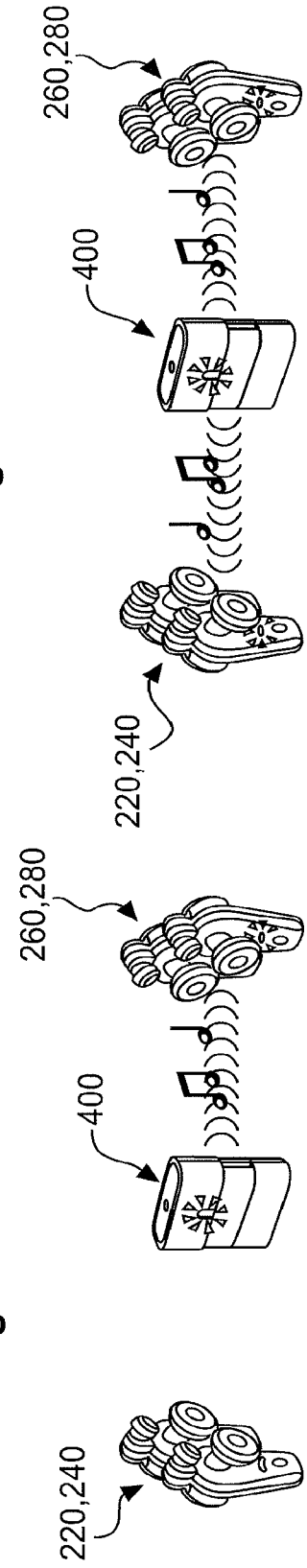
Fig. 13A  Fig. 13B
Fig. 13C  Fig. 13D
Fig. 13E  Fig. 13F

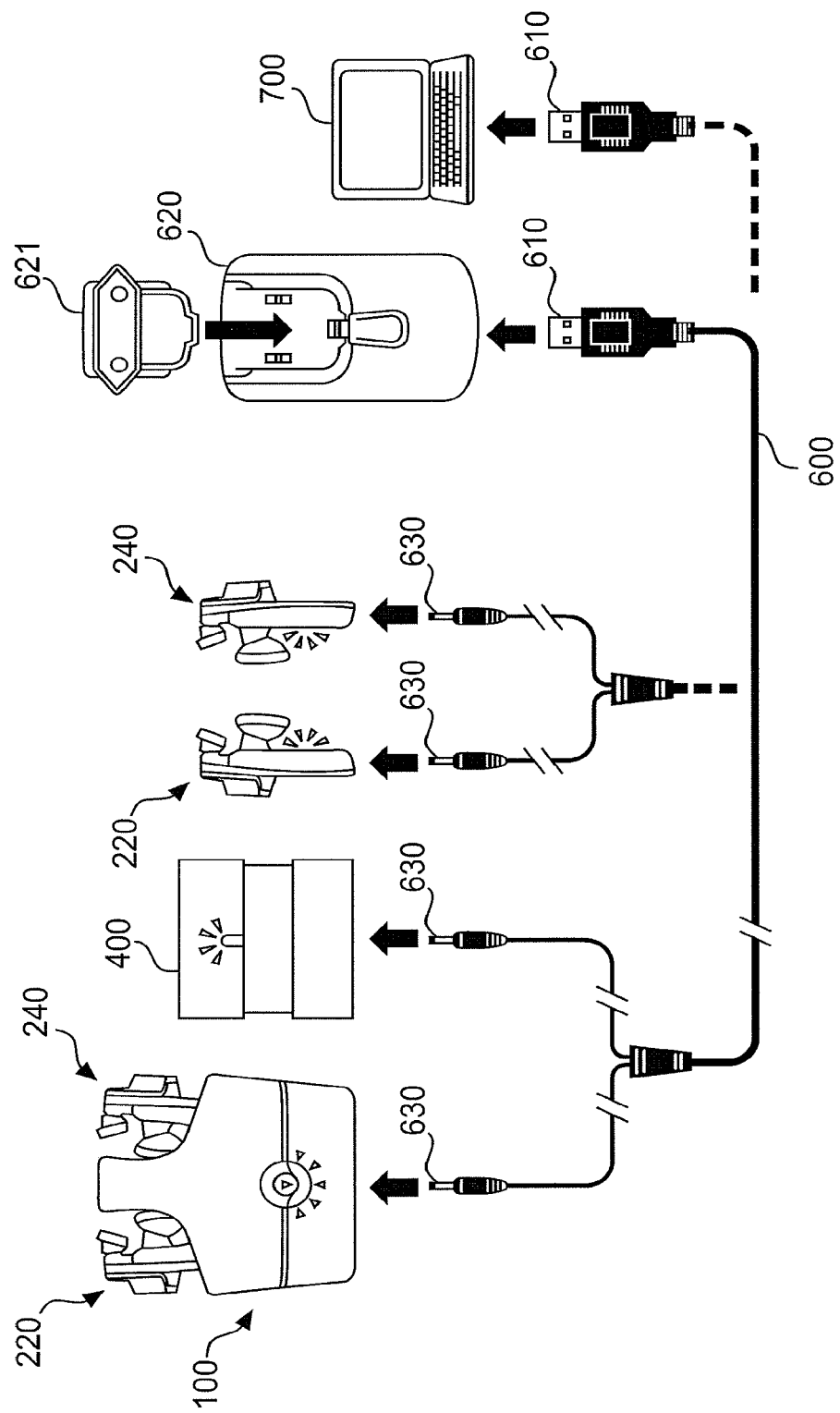

TRANSPORT AND/OR STORAGE CONTAINER FOR RECHARGEABLE WIRELESS EARPHONES

CROSS REFERENCE TO RELATED APPLICATION

This application is a continuation of U.S. patent application Ser. No. 15/295,757 filed Oct. 17, 2016, which is a continuation of U.S. patent application Ser. No. 14/666,071, filed Mar. 23, 2015, which is a continuation of U.S. patent application Ser. No. 12/459,466, filed Jun. 30, 2009, which claims priority from German Patent Application No. DE 10 2009 030 070.8 filed on filed Jun. 22, 2009, the disclosures of which are incorporated herein by reference in their entirety.

BACKGROUND

The present invention concerns a transport and/or storage container with integrated charging function for rechargeable wireless earphones. Furthermore the present invention concerns a rechargeable wireless earphone and a rechargeable transmitter for transmitting audio signals to a rechargeable wireless earphone. Finally the present invention concerns a charging cable for recharging the aforementioned devices.

BRIEF SUMMARY

When using rechargeable wireless earphones it is desirable to provide a transport and/or storage capability with integrated charging function for the rechargeable wireless earphones.

Therefore the object of the present invention is to provide a transport and/or storage container with integrated charging function for rechargeable wireless earphones.

That object is attained by the features of claim 1.

There is provided a transport and/or storage container with integrated charging function for rechargeable wireless earphones. The transport and/or storage container has a container housing, at least one receiving unit for at least partially receiving a rechargeable wireless earphone, and an electrical container charging contact for connecting the transport and/or storage container to an electrical energy source. The receiving unit has an electrical coupling contact cooperating with an electrical earphone charging contact of a rechargeable wireless earphone when it is placed in the receiving unit for recharging. The electrical container charging contact and the electrical coupling contact are in the form of mutually complementary electrical contacts.

The term "complementary electrical contacts" denotes electrical contacts which are intended to form together an electrical connection, for example a plug connection. In this example one of the electrical contacts would be the female part (plug socket) of the plug connection and the other electrical contact would be the male part (plug) of the plug connection.

The invention concerns the concept of providing a transport and/or storage container for rechargeable wireless earphones, which at the same time provides an integrated function for recharging the rechargeable wireless earphones. Because the electrical container charging contact, by way of which the transport and/or storage container can be connected to an electrical energy source, and the coupling contact which is provided in the receiving unit and cooperates with the electrical earphone charging contact of a rechargeable wireless earphone when it is placed in the receiving unit for charging are in the form of mutually complementary electrical contacts, the rechargeable wireless earphones can be recharged both in the transport and/or storage container and also separately, that is to say without being placed in the transport and/or storage container, in a highly flexible and simple fashion in the same way, for example by way of the same charging cable.

There is further provided a rechargeable wireless earphone. The rechargeable wireless earphone has an earphone housing, a transducer housing for receiving an electroacoustic transducer, an earphone battery for the storage of electrical energy, and an electrical earphone charging contact for connecting the rechargeable wireless earphone to an electrical energy source.

Finally there is provided a rechargeable transmitter for wirelessly transmitting audio signals to a rechargeable wireless earphone. The rechargeable wireless transmitter has a transmitter housing, a transmitter battery for the storage of electrical energy, and an electrical transmitter charging contact for connecting the rechargeable wireless transmitter to an electrical energy source.

Further configurations are subject-matter of the appendant claims.

Advantages and embodiments by way of example of the invention are described in greater detail hereinafter with reference to the drawings.

BRIEF DESCRIPTION OF THE DRAWINGS

FIGS. 8A-8D show diagrammatically and by way of example the replacement of the rechargeable earphone battery of the rechargeable wireless earphone in accordance with the second embodiment, FIGS. 13A-13F show diagrammatically and by way of example pairing of a second pair of rechargeable wireless earphones in accordance with the second embodiment with the rechargeable transmitter for the wireless transmission of audio signals to a rechargeable wireless earphone in accordance with the third embodiment, FIG. 14 shows diagrammatically and by way of example recharging of the transport and/or storage container with integrated charging function for rechargeable wireless earphones in accordance with the first embodiment, a pair of rechargeable wireless earphones in accordance with the second embodiment and the rechargeable transmitter for the wireless transmission of audio signals to a rechargeable wireless earphone in accordance with the third embodiment.

The same references in FIGS. 1 through 15 denote the same components.

DETAILED DESCRIPTION

Figure 1:
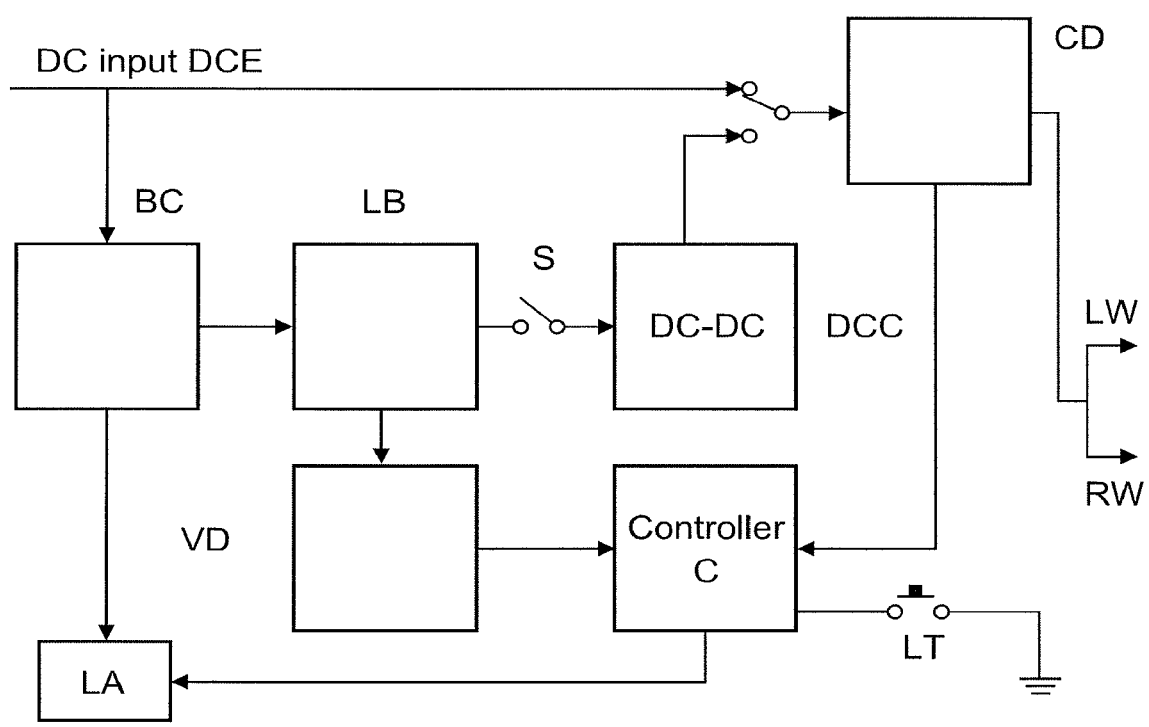
FIG. 1 shows diagrammatically and by way of example a block circuit diagram of a transport and/or storage container with integrated charging function for rechargeable wireless earphones in accordance with a first embodiment.

FIG. 1 shows diagrammatically and by way of example a block circuit diagram of a transport and/or storage container with integrated charging function for rechargeable wireless earphones in accordance with a first embodiment. The transport and/or storage container has a dc voltage input DCE, a battery charging unit BC, a rechargeable charging battery LB, a switch S, a dc voltage-dc voltage converter DCC, a current detection unit CD, a controller C, a voltage detection unit VD, a charging pushbutton switch LT and a charging display LA. The battery charging unit BC is coupled to the dc voltage input DCE. The dc voltage input DCE is also coupled to the current detection unit CD by way of a selection switch. The battery charging unit BC is coupled to the rechargeable charging battery LB and the charging display LA. The rechargeable charging battery LB is further connected to the dc voltage-dc voltage converter DCC by way of a switch S. The rechargeable charging battery LB is also coupled to a voltage detection unit VD. The voltage detection unit VD is coupled to the controller C. The current detection unit CD is coupled to the controller C and to charging contacts LW and RW for a pair of rechargeable wireless earphones. The controller C is further coupled to the charging pushbutton switch LT and the charging display LA.

Recharging of the rechargeable wireless earphones can be initiated by actuation of the charging pushbutton switch LT when the earphones are placed in the transport and/or storage container. The rechargeable charging battery LB is charged up by means of the battery charging unit BC. The voltage detection unit VD detects the voltage of the rechargeable charging battery LB and detects in particular if the battery voltage is too low.

When the transport and/or storage container is connected to a dc voltage input DCE, both the rechargeable charging battery LB (by way of the battery charging unit (BC)) and also a pair of rechargeable wireless earphones can be charged up when they are placed in the transport and/or storage container. If the transport and/or storage container is not coupled to the dc voltage input DCE, then recharging of the rechargeable wireless earphones which have been placed in the transport and/or storage container can be effected by means of the rechargeable charging battery LB and the dc voltage-dc voltage converter DCC.

The useable capacity of the rechargeable charging battery LB should be selected such that a pair of rechargeable wireless earphones can be recharged a number of times, in particular three times, without the rechargeable charging battery LB itself having to be recharged.

Recharging of the rechargeable wireless earphones placed in the transport and/or storage container can be initialized by actuation of the charging pushbutton switch LT.

The charging current of the rechargeable wireless earphones is detected by means of the current detection unit CD and recharging is terminated automatically when given conditions are reached. That is effected to maximize the efficiency of the rechargeable charging battery LB.

By means of the charging display LA, it is possible to display when the rechargeable charging battery LB of the transport and/or storage container is recharged, when the rechargeable wireless earphones are recharged and/or when the voltage of the rechargeable charging battery LB of the transport and/or storage container becomes too low.

In addition the electronic system of the transport and/or storage container can be at least partially automatically switched off if the useable capacity of the rechargeable charging battery LB becomes too low, to protect the rechargeable charging battery LB from overcharging.

The rechargeable charging battery LB can be implemented in the form of a lithium polymer accumulator with an electrical charge of for example 400 mAh or more.

Figure 2:
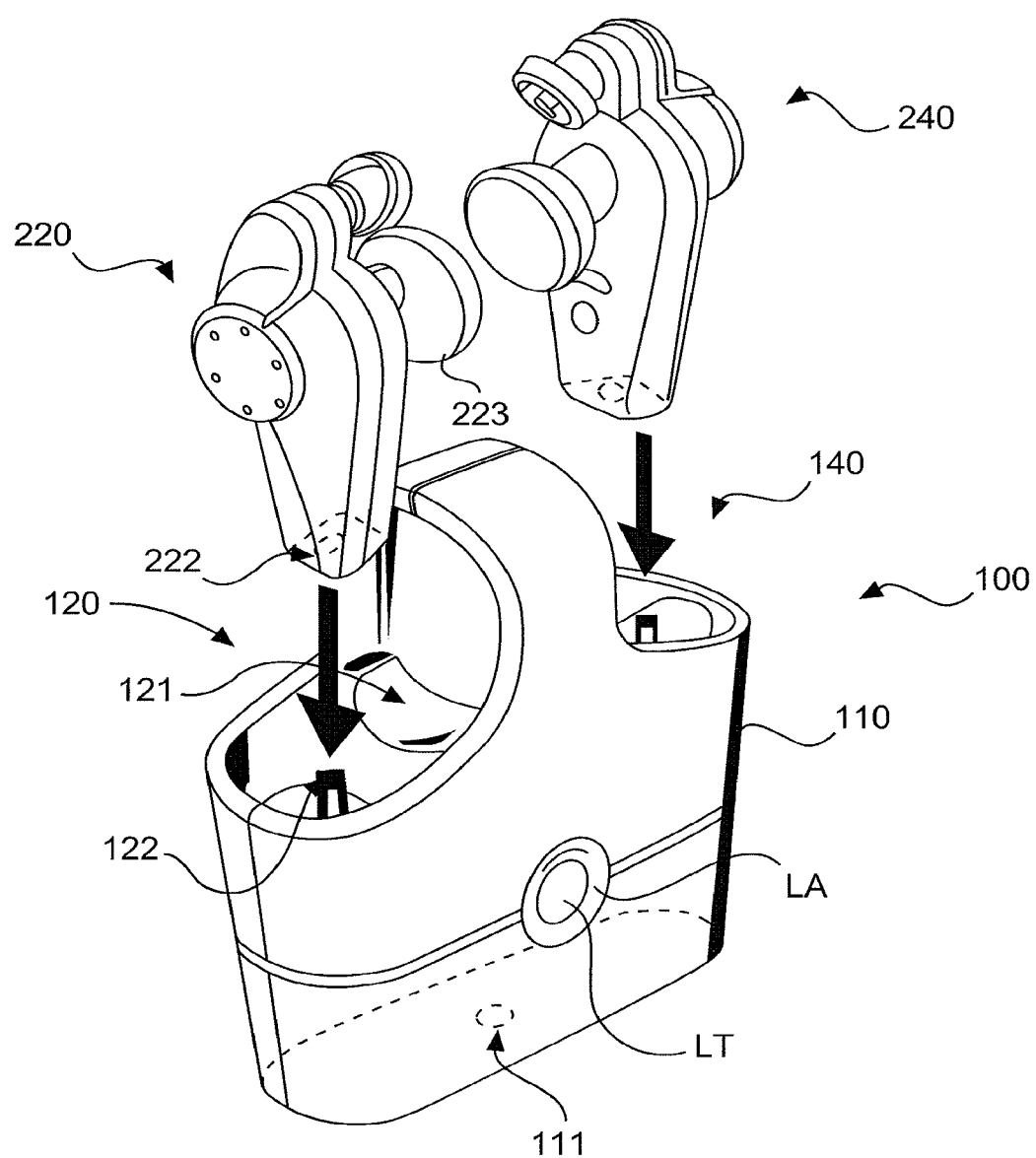
FIG. 2 shows diagrammatically and by way of example a first perspective view of the transport and/or storage container with integrated charging function for rechargeable wireless earphones in accordance with the first embodiment.

FIG. 2 shows diagrammatically and by way of example a first perspective view of the transport and/or storage container with integrated charging function 100 for rechargeable wireless earphones in accordance with the first embodiment. The transport and/or storage container 100 has a container housing 110 with an electrical container charging contact 111 for connecting the transport and/or storage container 100 to an electrical energy source. In this embodiment the electrical container charging contact 111 is a plug socket, in particular a 2.5 mm jack socket. Alternatively the electrical container charging contact 111 however can also be of a different configuration.

Furthermore the transport and/or storage container 100 has first and second receiving cradles or receiving units 120, 140. The first and second receiving cradles 120, 140 are of such a configuration that they can at least partially receive a respective rechargeable wireless earphone 220, 240 of a pair of rechargeable wireless earphones. The two receiving cradles 120, 140 are preferably of a substantially similar configuration so that further description is provided only in relation to the first receiving cradle 120. The description correspondingly applies to the second receiving cradle 140.

The first receiving cradle 120 is in particular of such a configuration that it can at least partially receive a rechargeable wireless earphone 220 substantially in positively locking relationship. In this embodiment the first receiving cradle 120 has a support surface 121 on which a transducer housing 223 of the rechargeable wireless earphone 220 comes to rest when it is placed in the first receiving cradle 120. In this respect the shape of the support surface 121 is preferably adapted to the shape of the transducer housing 223. That permits a particularly good and secure seat for the rechargeable wireless earphone 220 in the first receiving cradle 120.

Furthermore, provided in the region of the first receiving cradle 120 is an electrical coupling contact 122 cooperating with an electrical earphone charging contact 222 of a rechargeable wireless earphone 220 when it is placed in the first receiving cradle 120 for recharging. In that case the electrical container charging contact 111 and the electrical coupling contact 122 are in the form of mutually complementary electrical contacts. In other words, in this embodiment the electrical coupling contact 122 is a plug which is complementary to the plug socket (electrical container charging contact 111), in particular a 2.5 mm jack plug. (The electrical earphone charging contact 222 is then also an electrical contact which is complementary to the electrical coupling contact 122, or which corresponds to the electrical container charging contact 111, in other words, in this embodiment, a plug socket, in particular a 2.5 mm jack plug socket (see FIGS. 5-8)).

The first receiving cradle 120 is preferably of such a configuration that a rechargeable wireless earphone 220 which is placed in the first receiving cradle 120 is so guided by the shape thereof that the electrical earphone charging contact 222 and the electrical coupling contact 122 automatically come into contact by placement of the rechargeable wireless earphone 220 in the first receiving cradle 120.

In this embodiment the actuable charging pushbutton switch LT and the charging display LA are provided in or on the container housing 110. The charging display LA can be for example an LED which can light or flash in at least one color, preferably in a plurality of colors. Recharging of the rechargeable wireless earphones 220, 240 can be initialized by way of the actuatable charging pushbutton switch LT. By way of the charging display LA it is possible to display when the rechargeable charging battery LB of the transport and/or storage container 100 is recharged, the rechargeable wireless earphones 220, 240 are recharged and/or the voltage of the rechargeable charging battery LB of the transport and/or storage container 100 becomes too low.

Figure 3:
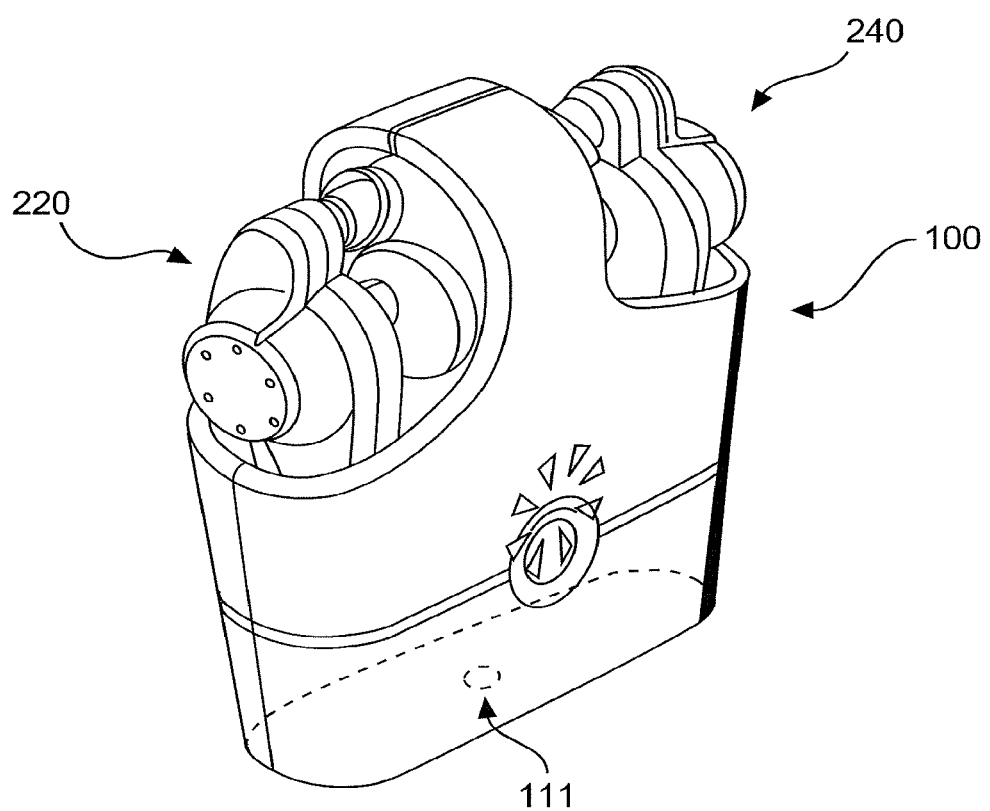
FIG. 3 shows diagrammatically and by way of example a second perspective view of the transport and/or storage container with integrated charging function for rechargeable wireless earphones in accordance with the first embodiment.

FIG. 3 shows diagrammatically and by way of example a second perspective view of the transport and/or storage container with integrated charging function 100 for rechargeable wireless earphones in accordance with the first embodiment. In this view a respective rechargeable wireless earphone 220, 240 of a pair of rechargeable wireless earphones are placed for recharging in the first and second receiving cradles 120, 140. Because the first and second receiving cradles 120, 140 are of such a configuration that they can receive the respective rechargeable wireless earphones 220, 240, at least partially and in particular substantially in positively locking relationship, they can be transported and/or stored in the transport and/or storage container 100 without falling out upon transport and/or storage.

Figure 4:
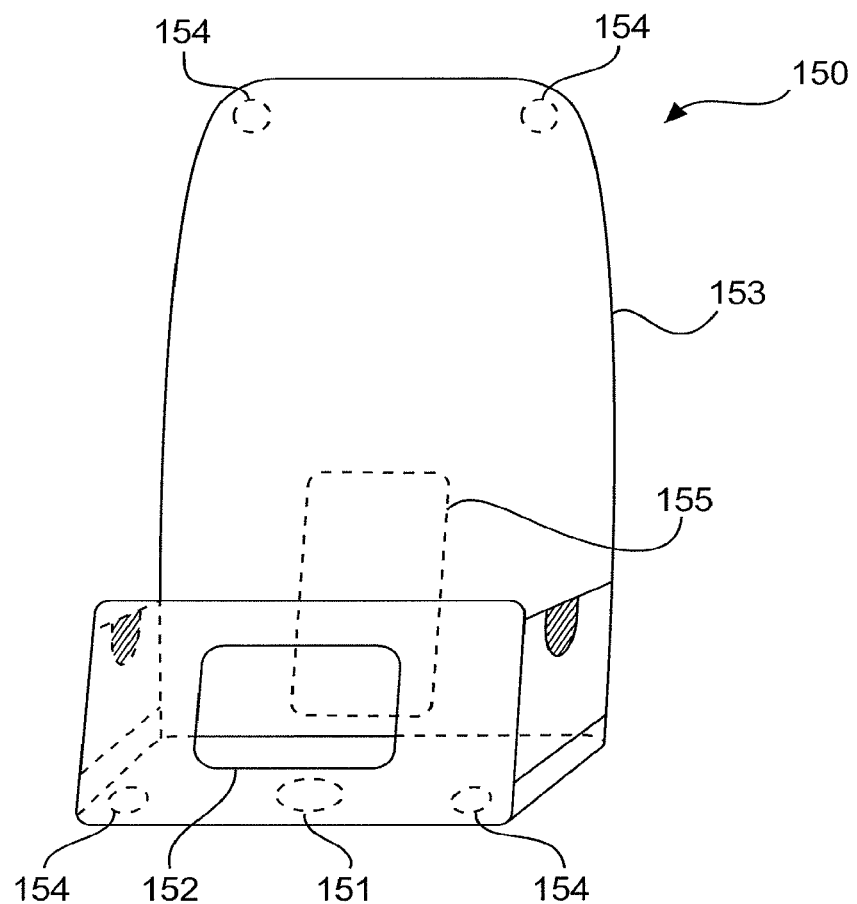
FIG. 4 shows diagrammatically and by way of example a protective pouch for the transport and/or storage container with integrated charging function for rechargeable wireless earphones in accordance with the first embodiment.

FIG. 4 shows diagrammatically and by way of example a protective pouch 150 for the transport and/or storage container 100 with integrated charging function for rechargeable wireless earphones in accordance with the first embodiment. The protective pouch 150 is preferably made from a robust material, for example leather or plastic, and has openings 151, 152, by way of which the electrical container charging contact 111 and the actuable charging pushbutton LT of the transport and/or storage container 100 are accessible when it is stored in the protective pouch 150. That permits recharging of the rechargeable charging battery LB of the transport and/or storage container 100, or the rechargeable wireless earphones 220, 240, also in the protective pouch 150. The protective pouch 150 further has a flap 153 which can be folded over the transport and/or storage container 100 for protection purposes and which is preferably fixed by magnetic closure elements 154. Optionally, provided on the protective pouch 150 is a flap or loop 155 with which the protective pouch 150 can be secured to the belt or to the wrist of a wearer.

It is preferable for the transport and/or storage container with integrated charging function 100 in accordance with the first embodiment (FIGS. 1-3) to be connectable for charging for example by way of a charging cable to an electrical energy source. Recharging of the transport and/or storage container 100 or the pair of rechargeable wireless earphones 220, 240 by way of a charging cable is described in greater detail with reference to FIG. 14.

Figure 5:
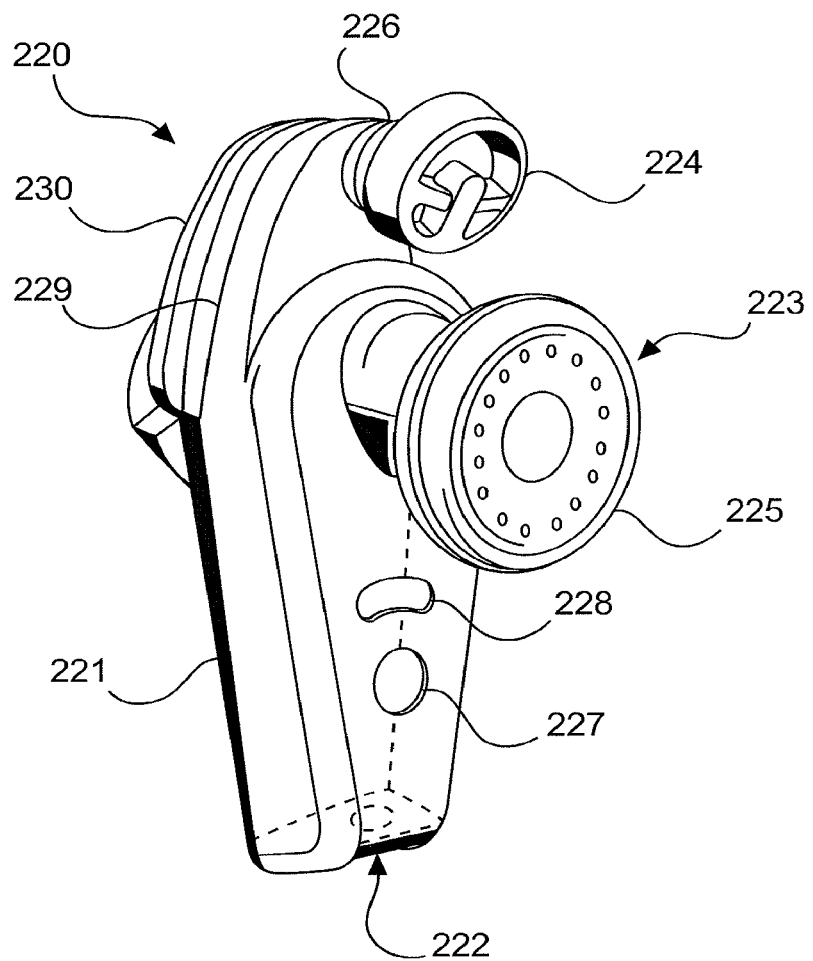
FIG. 5 shows diagrammatically and by way of example a rechargeable wireless earphone in accordance with a second embodiment.

FIG. 5 shows diagrammatically and by way of example a rechargeable wireless earphone 220 in accordance with a second embodiment. The rechargeable wireless earphone 220 can be an earphone of a pair of rechargeable wireless earphones 220, 240, as described with reference to FIGS. 2 and 3. The further description correspondingly applies to the second rechargeable wireless earphone 240.

In this embodiment the rechargeable wireless earphone 220 has an earphone housing 221 with an electrical earphone charging contact 222 for connection of the rechargeable wireless earphone 220 to an electrical energy source. In this embodiment the electrical earphone charging contact 222 is a plug socket, in particular a 2.5 mm jack socket. Alternatively however the electrical earphone charging contact 222 can also be of a different configuration.

Furthermore the rechargeable wireless earphone 220 has a transducer housing 223 for receiving an electroacoustic transducer (not shown) and a support element 224. When the rechargeable wireless earphone 220 is fitted into the ear of a wearer the transducer housing 223 rests on the auditory canal. To permit a comfortable fit for the rechargeable wireless earphone 220 the transducer housing 223 preferably has at its outer edge a removable ring 225 made from a soft flexible material such as for example rubber. In addition the transducer housing 223 can also be provided with a removable ear pad (not shown) for cushioning of the transducer housing 223. In that case the ear pad is preferably made from a sound-transmitting material such as for example foam.

The support element 224 can be removably fixed at an upper end 226 of the earphone housing 221. The support element 224 preferably involves a flexible structure and is made from a soft flexible material of good grippiness, such as for example rubber, so that it can be well inserted into the concha of a wearer to ensure a secure fit for the rechargeable wireless earphone 220. In particular it is preferable for the soft flexible material from which the support element 224 is made to be of a hardness of between 33 and 68 HA, in particular between 48 and 52 HA, a tensile strength of ≥5 MPa, in particular ≥7 MPa, an elongation of ≥224%, in particular ≥320%, a tearing strength of ≥12 KN/m, in particular ≥18 KN/m, a tensile deformation residue of ≤11%, in particular ≤8%, a linear shrinkage of 2.2 through 4.7%, in particular 3.1 through 3.6%, a plasticity of 130 through 290, in particular 180 through 220. The flexible structure of the support element 224 preferably has an outer edge which is connected to a central region of the support element 224 by three substantially mutually perpendicular limbs, wherein the edge portion of the support element 224, that is most remote from the transducer housing 223, does not involve any connection to the central region of the support element 224.

In the case of the rechargeable wireless earphone 220 the transducer housing 223 is in a first plane which is spaced in relation to a second plane in which the earphone housing 221 and/or the support element 224 is disposed. The second plane is preferably inclined in relation to the first plane. It is further preferred if the spacing between that point on the outer edge of the transducer housing 223, which is closest to the support element 224, and the outer center point of the support element 224, is between 5 and 11 mm, in particular between 7 and 9 mm.

An earphone pushbutton switch 227 and an earphone display 228 are provided in or on the earphone housing 221. The earphone display 228 can be for example an LED which can light or flash in at least one color, preferably in a plurality of colors.

The rechargeable wireless earphone 220 further has a battery compartment 229 for receiving a rechargeable earphone battery (not shown) for the storage of electrical energy. The rechargeable earphone battery can be for example a lithium ion button cell with a voltage of 3.7 V and an electrical charge of 40 mAh. The battery compartment 229 is preferably covered with a removable cap 230 so that if required the rechargeable earphone battery can be easily replaced. Replacement of the rechargeable earphone battery of the rechargeable wireless earphone 220 is described in greater detail with reference to FIGS. 8A-8D.

A wireless receiving unit (not shown) is provided in the earphone housing 221 so that audio signals can be wirelessly transmitted to the rechargeable wireless earphone 220. That wireless communication preferably uses a high-grade uncompressed wireless stereo transmission by way of a stable digital connection. The carrier frequency used can be for example a frequency in the range of 2.4 GHz through 2.48 GHz. In that respect for example an FSK process (frequency shift keying) and in particular an MSK process (minimum shift keying) can be used for modulation purposes. Alternatively the wireless communication can also be based on the Bluetooth protocol, the WLAN protocol or another wireless protocol.

The rechargeable wireless earphone 220 is preferably light, of a weight of less than 20 g, in particular a weight of about 10 g. The size of the rechargeable wireless headphone 220 is preferably in the region of about 29×20.5×51 mm. If the rechargeable earphone battery is completely charged the operating time of the rechargeable wireless earphone 220 should be about three hours or more. The further preferred technical data of the rechargeable wireless headphone 220 are as follows: maximum acoustic pressure level: about 115 dB (SPL); distortion factor: <0.5% at 1 kHz 100 dB SPL; frequency range: 19 Hz through 20 kHz; charging time of the rechargeable earphone battery AHB: about 2 hours; voltage supply: 5 V DC/30 mA.

It is preferable that the rechargeable wireless earphone 220 can be switched on by pressing the earphone pushbutton switch 227 for a predetermined time of for example four seconds. Successful switch-on can be indicated by way of the earphone display 228, for example by colored flashing at a predetermined flashing rate of for example once per second. If the rechargeable wireless earphone 220 has been placed in the transport and/or storage container with integrated charging function 100 in accordance with the first embodiment (FIGS. 1-3), as described with reference to FIGS. 2 and 3, the rechargeable wireless earphone 220 preferably switches on when it is removed from the transport and/or storage container 100. Switch-off the rechargeable wireless earphone 220 preferably functions in such a way that the earphone pushbutton switch 227 is pressed for a predetermined time of for example four seconds. Successful switch-off can also be indicated by way of the earphone display 228, for example by colored lighting thereof for a predetermined time of for example a second. If the rechargeable wireless earphone 220 is placed in the transport and/or storage container with integrated charging function 100 in accordance with the first embodiment (FIGS. 1-3), as described with reference to FIGS. 2 and 3, the rechargeable wireless earphone 220 preferably switches off. It is further preferred if the rechargeable wireless earphone 220 switches off itself if, after a predetermined period of for example five minutes, no connection could be made to a transmitter (see FIGS. 12 and 13).

Figure 6A:
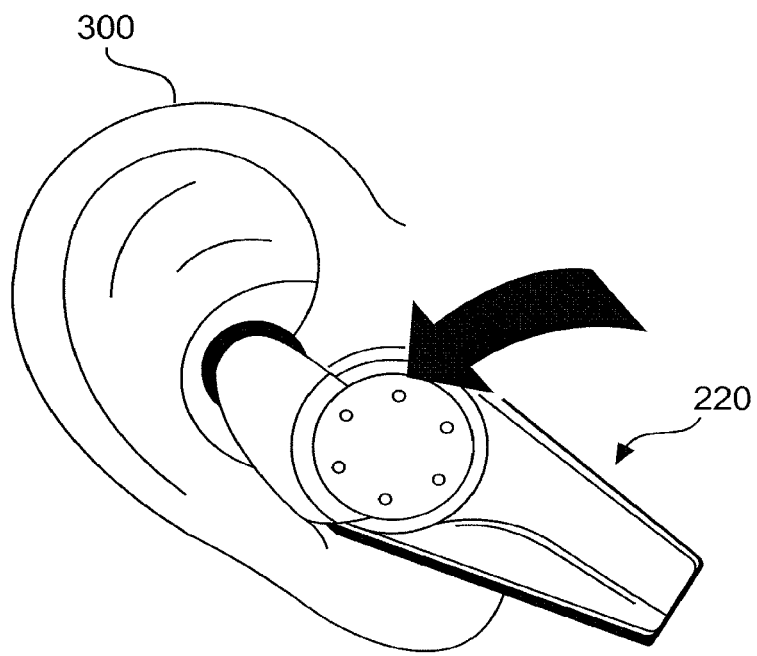
FIGS. 6A and 6B show diagrammatically and by way of example insertion of the rechargeable wireless earphone according to the second embodiment in the ear of a wearer.
Figure 6B:
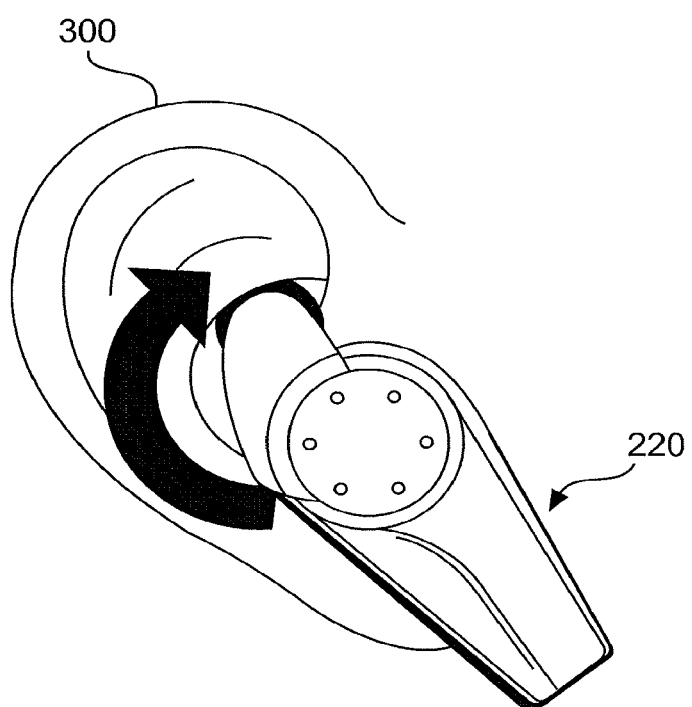

FIGS. 6A and 6B show diagrammatically and by way of example insertion of the rechargeable wireless earphone 220 in accordance with the second embodiment into the ear 300 of a wearer. In this case the rechargeable wireless earphone 220 is firstly fitted into the ear 300 of the wearer in such a way that the transducer housing 223 rests on the auditory canal (FIG. 6A). Thereupon the rechargeable wireless earphone 220 is turned until the support element 224 is seated securely in the concha of the wearer (FIG. 6B).

Figure 7:
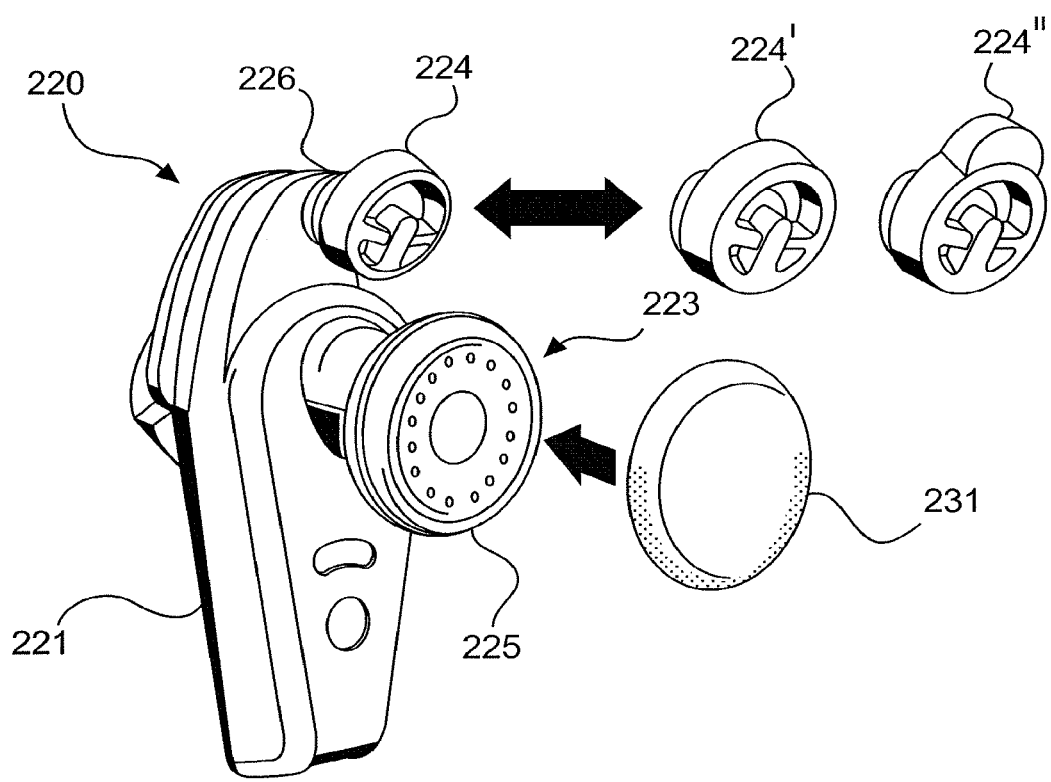
FIG. 7 shows diagrammatically and by way of example the replacement of adapter parts of the rechargeable wireless earphone in accordance with the second embodiment.

FIG. 7 shows diagrammatically and by way of example the replacement of adapter parts of the rechargeable wireless earphone 220 in accordance with the second embodiment. Thus preferably the support element 224 can be removed from the upper end 226 of the earphone housing 221 and replaced. In that case it is preferable for support elements 224, 224', 224" of different sizes and/or shapes to be provided so that the rechargeable wireless earphone 220 can be adapted to the specific ear shape and/or size of a wearer by using the appropriate support element 224, 224', 224". In addition it is preferable that the ring 225 can be removed from the outer edge of the transducer housing 223 and replaced. In addition a removable ear pad 231 should be provided for cushioning of the transducer housing 223. Preferably all adapter parts of the rechargeable wireless earphone, that is to say the support elements 224, 224', 224", the ring 225 and the ear pad 231 are provided in a plurality of configurations.

FIG. 8A-8D shows diagrammatically and by way of example the replacement of the rechargeable earphone battery 232 of the rechargeable wireless earphone 220 in accordance with the second embodiment. In this case firstly the edge of the removable cap 230 is lifted somewhat and the removable cap 230 displaced in such a way that latching projections 233 (see FIG. 8C) which are provided on the removable cap 230 and which come into engagement in guides 234 (see FIG. 8C) at the inner edge of the battery compartment 229 when the (removable) cap 230 is closed can be pushed out of those guides 234 (FIG. 8A). The rechargeable earphone battery 232 can then be removed from the battery compartment 229 and replaced, wherein attention is to be paid to the polarity of the rechargeable earphone battery 232 when fitting it in place (FIG. 8B). Thereafter the removable cap 230 is re-fitted onto the battery compartment 229 (with the inserted rechargeable earphone battery 232) (FIG. 8C) and displaced in such a way that the latching projections 233 come into engagement in the guides 234 again (FIG. 8D).

It is preferable if the rechargeable wireless earphone 220 in accordance with the second embodiment (FIGS. 5-8) can be connected for recharging by way of a charging cable to an electrical energy source. Recharging of the rechargeable wireless earphone 220 by way of a charging cable is described in greater detail with reference to FIG. 14.

Figure 9:
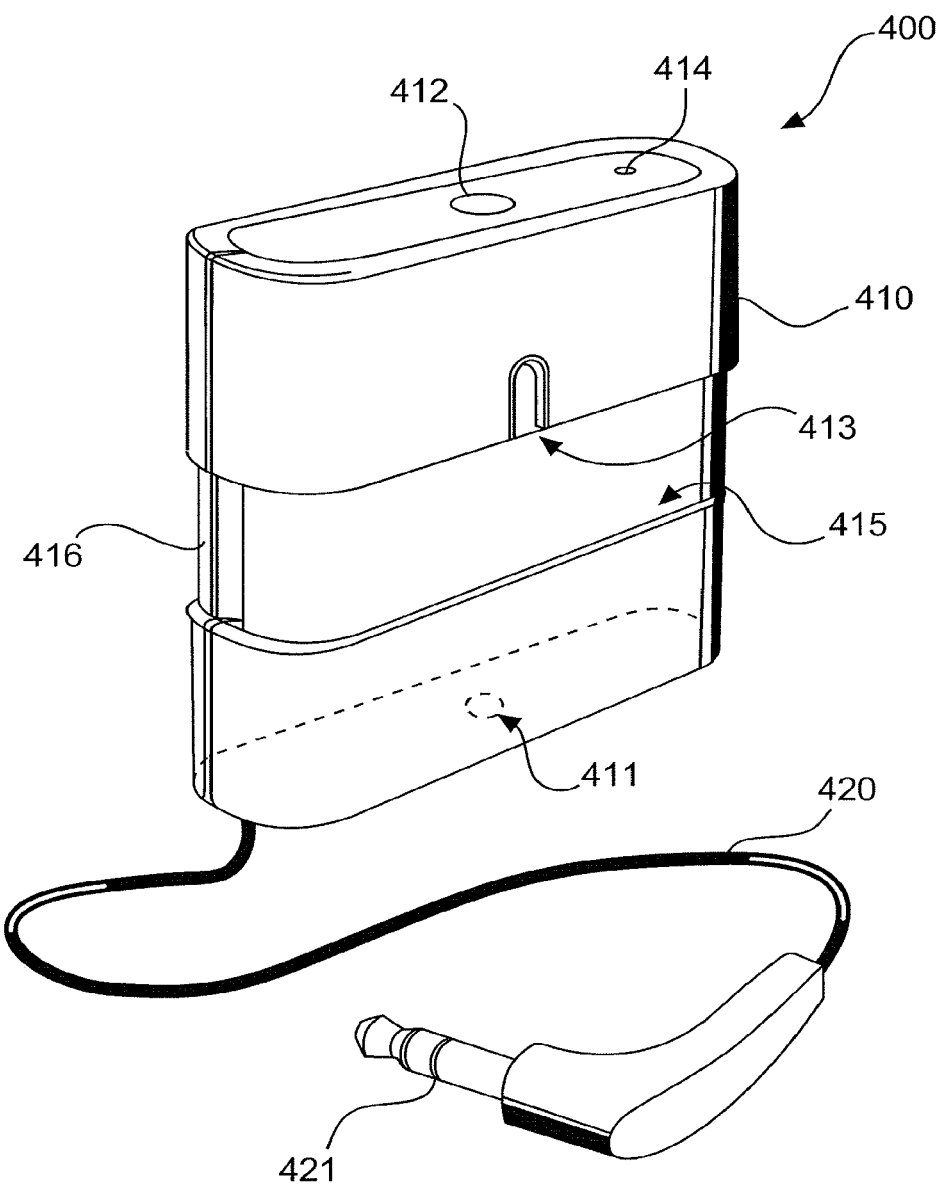
FIG. 9 shows diagrammatically and by way of example a first perspective view of a rechargeable transmitter for the wireless transmission of audio signals to a rechargeable wireless earphone in accordance with a third embodiment.

FIG. 9 shows diagrammatically and by way of example a first perspective view of a rechargeable transmitter 400 for the wireless transmission of audio signals to a rechargeable wireless earphone in accordance with a third embodiment. In this embodiment the rechargeable transmitter 400 has a transmitter housing 410 with an electrical transmitter charging contact 411 for connecting the rechargeable transmitter 400 to an electrical energy source. In this embodiment the electrical transmitter charging contact 411 is a plug socket, in particular a 2.5 mm jack socket. Alternatively the electrical transmitter charging contact 411 however can also be of a different configuration.

Furthermore the rechargeable transmitter 400 has a connecting cable 420 for connecting the rechargeable transmitter 400 to a mobile audio and/or video device. As mobile audio and/or video devices such as for example MP3 players, CD and DVD players or the iPod series from Apple, typically provide as the audio output jack sockets, in particular 3.5 mm stereo jack sockets, the connecting cable 420 preferably has a 3.5 mm stereo jack plug 421. Alternatively however it is also possible to provide another standardized connecting contact or optionally a suitable adapter for other kinds of audio outputs such as for example 2.5 mm or 6.35 mm stereo jack sockets.

Provided in or on the transmitter housing 410 are a transmitter pushbutton switch 412, a transmitter display 413 and a reset pushbutton switch 414. The transmitter display 413 can be for example an LED which can light or flash at least in one color, preferably in a plurality of colors.

The rechargeable transmitter 400 further has a rechargeable transmitter battery (not shown) for storing electrical energy. The rechargeable transmitter battery can be for example in the form of a lithium ion battery or a lithium polymer battery with an electrical charge of for example between 150 and 3,000 mAh, preferably for example about 240 mAh or more.

In a central portion the transmitter housing 410 has a band-like recess 415 which preferably extends completely around the transmitter housing 410. A respective cylindrical pin 416 can be arranged at each of the two short sides in the region of the band-like recess 415. The band-like recess 415 and the optional cylindrical pins 416, in combination with a suitable fixing band, for example a rubber band, permit the rechargeable transmitter 400 to be easily and securely fixed to a mobile audio and/or video device. Fixing of the rechargeable transmitter 400 to a mobile audio and/or video device is described in greater detail with reference to FIGS. 10 and 11.

Provided in the transmitter housing 410 is a wireless transmitting unit (not shown) for the wireless transmission of audio signals to a rechargeable wireless earphone or to a pair of rechargeable wireless earphones. That wireless communication preferably uses a high-grade uncompressed wireless stereo transmission by way of a stable digital connection. The carrier frequency used can be for example a frequency in the range of 2.4 GHz through 2.48 GHz. In that respect for example an FSK process (frequency shift keying) and in particular an MSK process (minimum shift keying) can be used for modulation purposes. Alternatively the wireless communication can also be based on the Bluetooth protocol, the WLAN protocol or another wireless protocol.

The rechargeable transmitter 400 is preferably light, of a weight of less than 32 g, in particular of a weight of about 16 g. The size of the rechargeable transmitter 400 is preferably in the region of about 40×13×40 mm. When the rechargeable transmitter battery is fully charged the operating time of the rechargeable transmitter 400 should be about ten hours or more. The further preferred technical data of the rechargeable transmitter 400 are: charging time of the rechargeable transmitter battery ASB: about 2 hours; voltage supply: 5 V DC/120 mA.

It is preferable if the rechargeable transmitter 400 can be switched on by pressing the transmitter pushbutton switch 412 for a predetermined time of for example four seconds. Successful switch-on can be indicated by way of the transmitter display 413, for example by colored flashing at a predetermined flashing rate of for example once per second. Switch-off of the rechargeable transmitter 400 preferably functions in such a way that the transmitter pushbutton switch 412 is pressed for a predetermined time of for example four seconds. Successful switch-off can also be indicated by way of the transmitter display 413, for example by colored lighting for a predetermined time of for example a second. It is preferable if the rechargeable transmitter 400 switches off itself if no connection could be made to a wireless earphone (see FIGS. 12 and 13) after a predetermined time of for example five minutes.

Figure 10:
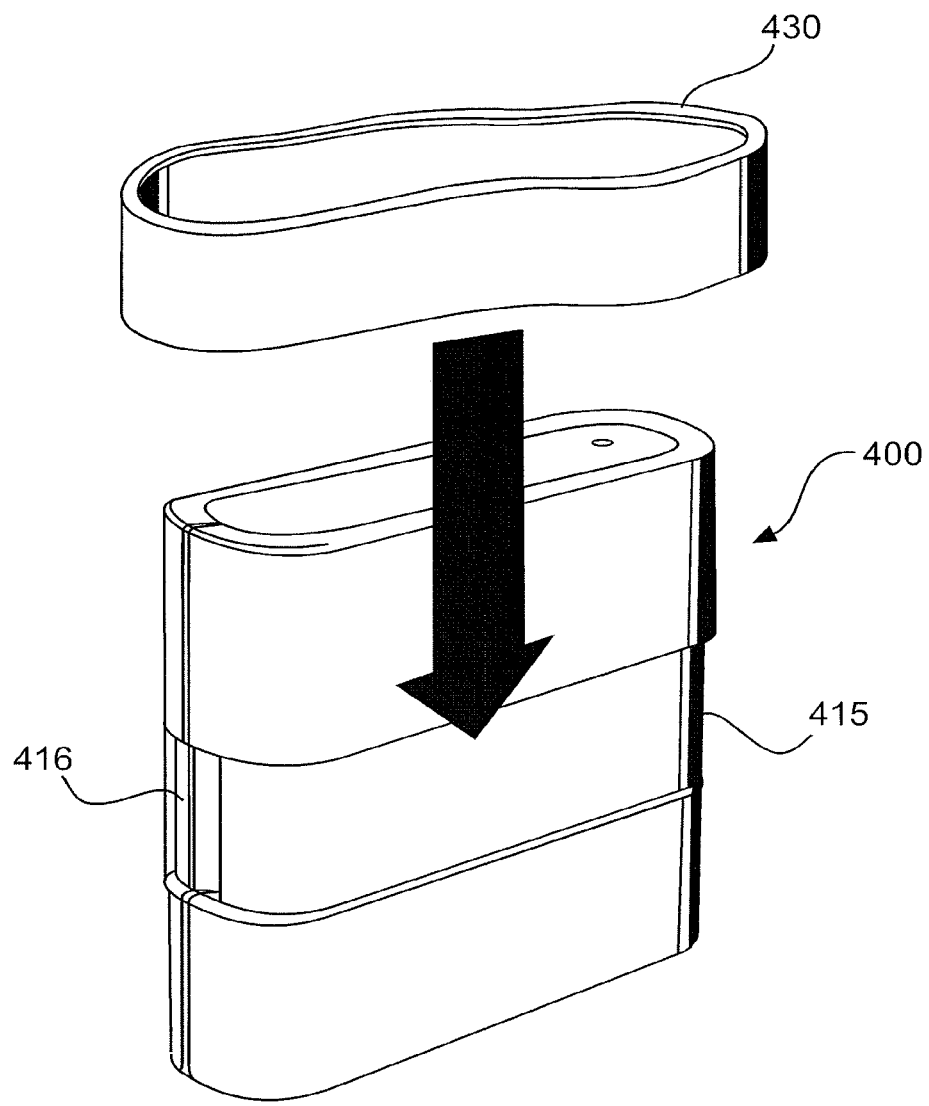
FIG. 10 shows diagrammatically and by way of example a second perspective view of a rechargeable transmitter for the wireless transmission of audio signals to a rechargeable wireless earphone in accordance with the third embodiment.

FIG. 10 shows diagrammatically and by way of example a second perspective view of the rechargeable transmitter 400 for the wireless transmission of audio signals to a rechargeable wireless earphone in accordance with the third embodiment. This view shows how a fixing band 430 can be pushed over the rechargeable transmitter 400. The band-like recess 415 and the two optional cylindrical pins 416 permit secure fixing of the fixing band 430 to the rechargeable transmitter 400. In this embodiment the fixing band 430 is a rubber band which is closed in itself and preferably flat. Alternatively the fixing band 430 can also be a band which is adjustable in length, such as for example a length-adjustable rubber band, a length-adjustable elastic material band or a length-adjustable band of a substantially non-elastic material. A buckle or clasp or a comparable adjusting device can be provided in that case for length adjustment. Preferably there are fixing bands 430 of different sizes and/or kinds and/or colors. That permits simple and secure fixing of the rechargeable transmitter 400 to mobile audio and/or video devices of different shapes and sizes.

It is particularly preferred in accordance with the invention if the device according to the invention is supplied not only together with a single fixing band 430 but with a multiplicity thereof which again are preferably of varying sizes because that ensures best possible adaptation of the transmitter to playback devices coupled thereto, for example an MP3 player, for the various playback devices are always of a differing thickness, height and depth. It is also particularly preferred in that respect if the various fixing bands, that is to say the flat rubber bands, are of quite different colors in order thereby also to ensure optimum color matching to the playback device.

Additionally or alternatively to the possible option of fixing the rechargeable transmitter 400 to a mobile audio and/or video device with a fixing band 430, it is also possible to provide other fixing options. For example the rechargeable transmitter 400 can be provided with a magnet for magnetically fixing the rechargeable transmitter 400 to a mobile audio and/or video device, while a metal element such as for example a self-adhesive metal plate can be secured to the mobile audio and/or video device.

Figure 11:
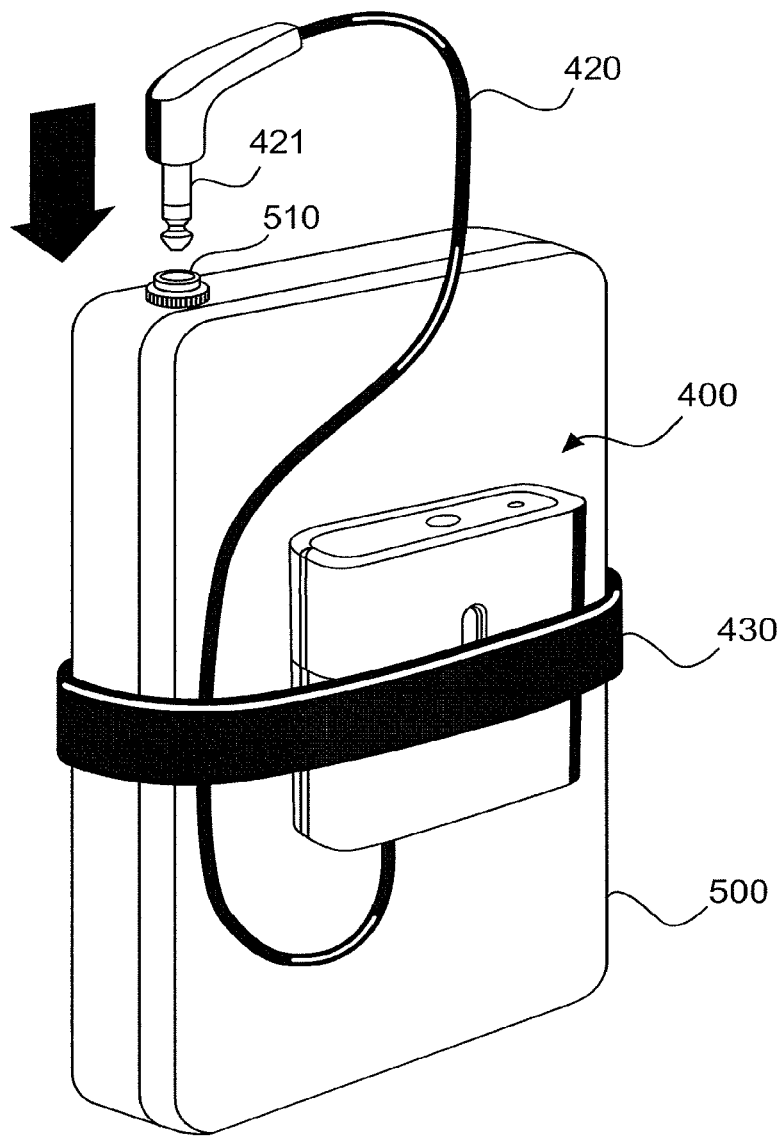
FIG. 11 shows diagrammatically and by way of example a possible way of fixing the rechargeable transmitter for the wireless transmission of audio signals to a rechargeable wireless earphone in accordance with the third embodiment to a mobile audio and/or video device.

FIG. 11 shows diagrammatically and by way of example a possible way of fixing the rechargeable transmitter 400 for wireless transmission of audio signals to a rechargeable wireless earphone in accordance with the third embodiment to a mobile audio and/or video device 500. To connect the rechargeable transmitter 400 to the mobile audio and/or video device 500 the 3.5 mm stereo jack plug 421 of the connecting cable 420 is inserted into the audio output 510 of the mobile audio and/or video device 500. Because the rechargeable transmitter 400 itself has a rechargeable transmitter battery (not shown) for storing electrical energy the battery of the mobile audio and/or video device 500 is not subject to any loading. The rechargeable transmitter 400 can be fixed with a suitable fixing band 430 for example on the rear side of the mobile audio and/or video device 500. It is preferable if, on that side of the transmitter housing 410, which comes to bear against the mobile audio and/or video device 500 when the rechargeable transmitter 400 is fixed thereto, the rechargeable transmitter 400 has protective elements, for example strips of a soft flexible material such as for example rubber to protect the mobile audio and/or video device 500 from damage such as for example scratching.

It is preferable if the rechargeable transmitter 400 in accordance with the third embodiment (FIGS. 9-11) can be connected for recharging purposes by way of charging cable to an electrical energy source. Recharging of the rechargeable transmitter 400 by way of a charging cable is described in greater detail with reference to FIG. 14.

Figure 12A:
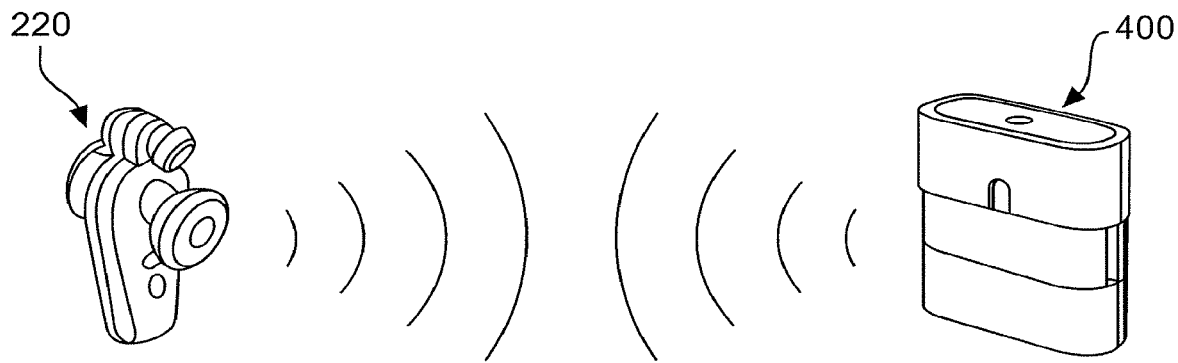
FIGS. 12A-12C show diagrammatically and by way of example pairing of the rechargeable wireless earphone in accordance with the second embodiment with the rechargeable transmitter for the wireless transmission of audio signals to a rechargeable wireless earphone in accordance with the third embodiment.
Figure 12B:
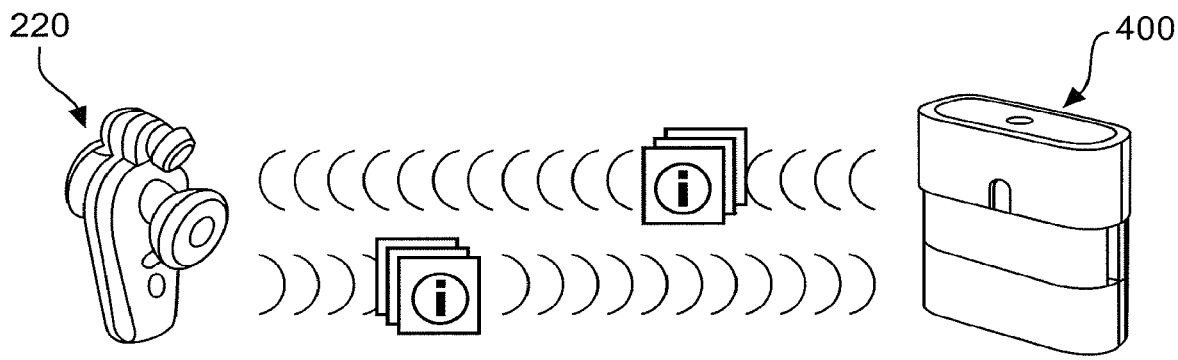
Figure 12C:
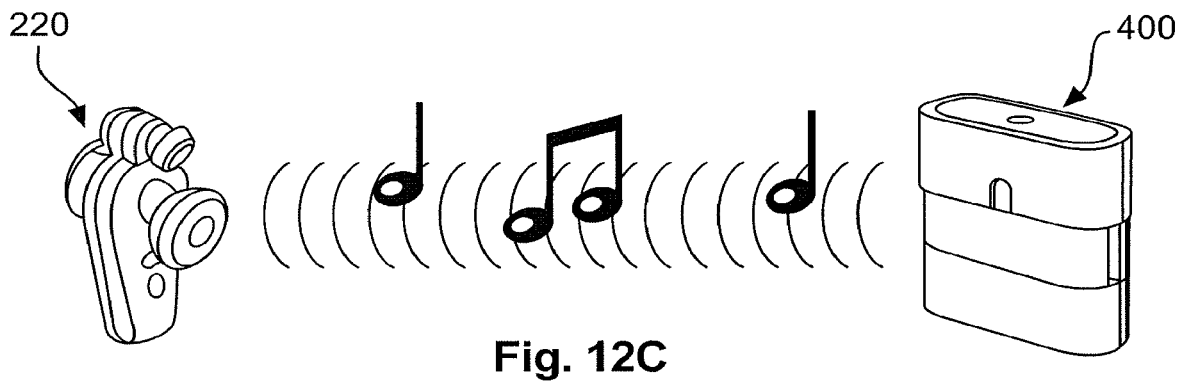

FIGS. 12A-12C show diagrammatically and by way of example pairing of the rechargeable wireless earphone 220 in accordance with the second embodiment to the rechargeable transmitter 400 for wireless transmission of audio signals to a rechargeable wireless earphone in accordance with the third embodiment. In this case firstly the rechargeable wireless earphone 220 and the rechargeable transmitter 400 are switched on as described with reference to FIGS. 5 and 9. The rest of the pairing procedure is then effected substantially without further manual steps being necessary (plug & play). Firstly both the rechargeable wireless earphone 220 and also the rechargeable transmitter 400 search for a suitable device (FIG. 12A). That search procedure can be indicated by way of the earphone display 228 or by way of the transmitter display 413, for example by colored flashing at a predetermined flashing rate of for example once per second. After the rechargeable wireless earphone 220 and the rechargeable transmitter 400 have been found the devices exchange an identification ID, for example a hexadecimal code word (FIG. 12B). That exchange process can also be indicated by way of the earphone display 228 or the transmitter display 413, for example by colored flashing at a predetermined flashing rate of for example twice per second. After successful device identification finally a connection is automatically made between the rechargeable wireless earphone 220 and the rechargeable transmitter 400. Audio signals can then be passed wirelessly by way of that connection from the rechargeable transmitter 400 to the rechargeable wireless earphone 220 (FIG. 12C). The connecting between the rechargeable wireless earphone 220 and the rechargeable transmitter 400 can also be indicated by way of the earphone display 228 or the transmitter display 413, for example by colored flashing at a predetermined flashing rate of for example once every five seconds.

The foregoing description correspondingly applies to pairing a pair of rechargeable wireless earphones 220, 240, as are shown with reference to FIGS. 2 and 3, with the rechargeable transmitter 400.

It is preferable if the transmitter range, that is to say the maximum distance between the rechargeable transmitter 400 and the rechargeable wireless earphone 220, at which the rechargeable wireless earphone 220 can still receive audio signals transmitted wirelessly by the rechargeable transmitter 400, is ≥10 m, in particular ≥5 m.

FIGS. 13A-13F show diagrammatically and by way of example pairing of a second pair of rechargeable wireless earphones 260, 280 in accordance with the second embodiment with the rechargeable transmitter 400 for wireless transmission of audio signals to a rechargeable wireless earphone in accordance with the third embodiment. In this case firstly the second pair of rechargeable wireless earphones 260, 280, that is to say the new rechargeable wireless earphones 260, 280, are switched off as described with reference to FIG. 5 and the first pair of rechargeable wireless earphones 220, 240, that is to say the old rechargeable wireless earphones 220, 240 and the rechargeable transmitter 400 are switched on as described with reference to FIGS. 5 and 8 (FIG. 13A). The resulting connection between the old rechargeable wireless earphones 220, 240 and the rechargeable transmitter 400 can be indicated as described with reference to FIG. 12 by way of the earphone display 228 or the transmitter display 413, for example by colored flashing at a predetermined flashing rate of for example once every five seconds. Thereafter the rechargeable transmitter 400 is switched off as described with reference to FIG. 9 (FIG. 13B). Then the earphone pushbutton switch 227 of the new rechargeable wireless earphones 260, 280 is pressed for a predetermined period of for example seven seconds. Expiry of the predetermined period can also be indicated by way of the earphone display 228, for example by fast colored flashing (FIG. 13C). Thereupon the transmitter pushbutton switch 412 is pressed for a predetermined period of for example seven seconds, in which case expiry of the predetermined period can be indicated by way of the transmitter display 413, for example by fast colored flashing (FIG. 13D). After a predetermined period of for example three seconds the new rechargeable wireless earphones 260, 280 are then paired with the rechargeable transmitter 400 (FIG. 13E). The resulting connection between the new rechargeable wireless earphones 260, 280 and the rechargeable transmitter 400 can then be indicated as described with reference to FIG. 12 by way of the earphone displays 228 or the transmitter display 413, for example by colored flashing at a predetermined flashing rate of for example once every five seconds. Finally the transmitter pushbutton switch 412 is pressed a further time for a predetermined duration of for example one second. After a further predetermined duration of for example three seconds the old rechargeable wireless headphones 220, 240 are then also connected to the rechargeable transmitter 400.

FIG. 14 shows diagrammatically and by way of example charging of the transport and/or storage container with integrated charging function 100 for rechargeable wireless earphones in accordance with the first embodiment, a pair of rechargeable wireless earphones 220, 240 in accordance with the second embodiment and the rechargeable transmitter 400 for wireless transmission of audio signals to a rechargeable wireless earphone in accordance with the third embodiment. A charging cable 600 is provided for connecting the various devices 100, 220, 240, 400 to an electrical energy source. At one end the charging cable 600 preferably has a USB plug 610, for example of type A, by way of which the charging cable 600 can be connected to a USB interface, for example of a computer 700, as the electrical energy source. In addition there can be a power supply unit 620 which can be connected to the USB plug 610 and by way of which the charging cable 600 can be connected to an electrical mains supply as the electrical energy source.

Optionally various interchangeable country adapters 621 can be provided for the power supply unit 620. That makes it possible to use the charging cable 600 in countries involving different mains standards.

The charging cable 600 at its second end has at least one electrical charging contact 630 which is in the form of an electrical contact which is complementary to the electrical container charging contact 111 of the transport and storage container 100, to the electrical earphone charging contact 221 of the rechargeable wireless earphones 220, 240 and to the electrical transmitter charging contact 411 of the rechargeable transmitter 400. In other words, in the first through third embodiments, the electrical charging contact 630 is a plug complementary to the plug sockets 111, 221, 411, in particular a 2.5 mm jack plug. Thus the charging cable 600 can be connected by way of the at least one charging contact 630 to the transport and storage container 100, to the two rechargeable wireless earphones 220, 240 and/or to the rechargeable transmitter 400, for recharging thereof. If the two rechargeable wireless earphones 220, 240 are placed in the transport and storage container 100 as described with reference to FIGS. 2 and 3, both the rechargeable charging battery LB of the transport and storage container 100 and also the two rechargeable wireless earphones 220, 240 can be simultaneously recharged by way of the charging cable 600. If the charging cable 600 has two or more charging contacts 630 at the second end, then both rechargeable wireless earphones 220, 240 can be simultaneously recharged by way of the charging cable 600 or, if the two rechargeable wireless earphones 220, 240 are placed in the transport and storage container 100 as described with reference to FIGS. 2 and 3, both the rechargeable charging battery LB of the transport and storage container 100 inclusive of the two rechargeable wireless earphones 220, 240 and also the wireless transmitter 400 can be recharged.

Although the transport and/or storage container with integrated charging function 100 in accordance with the first embodiment (FIGS. 1-3) was described as a container for rechargeable wireless earphones, the transport and/or storage container 100 can also serve to recharge other rechargeable mobile electronic devices such as for example cellular phones, PDAs, mobile and/or video devices, games consoles and so forth during transport and/or storage. While the transport and/or storage container with integrated charging function 100 in accordance with the first embodiment (FIGS. 1-3) was described as a container having two receiving cradles 120, 140 for receiving a pair of rechargeable wireless earphones 220, 240, the transport and/or storage container 100 may also have only one receiving cradle, for example for a rechargeable wireless earphone or another rechargeable mobile electronic device, or more than two receiving cradles, for example for a larger number of rechargeable mobile electronic devices.

The rechargeable wireless earphone 220 or the pair of rechargeable wireless earphones 220, 240 in accordance with the second embodiment (FIGS. 5-8) can also be in the form of a rechargeable wireless headset. In that case a microphone has been provided on at least one rechargeable wireless earphone 220, 240. In addition the rechargeable wireless headset must be of such a design that the speech signals recorded by the microphone are transmitted by means of a wireless transmitting unit. For that purpose a wireless transmitting/receiving unit can be provided in the rechargeable wireless headset.

Figure 15:
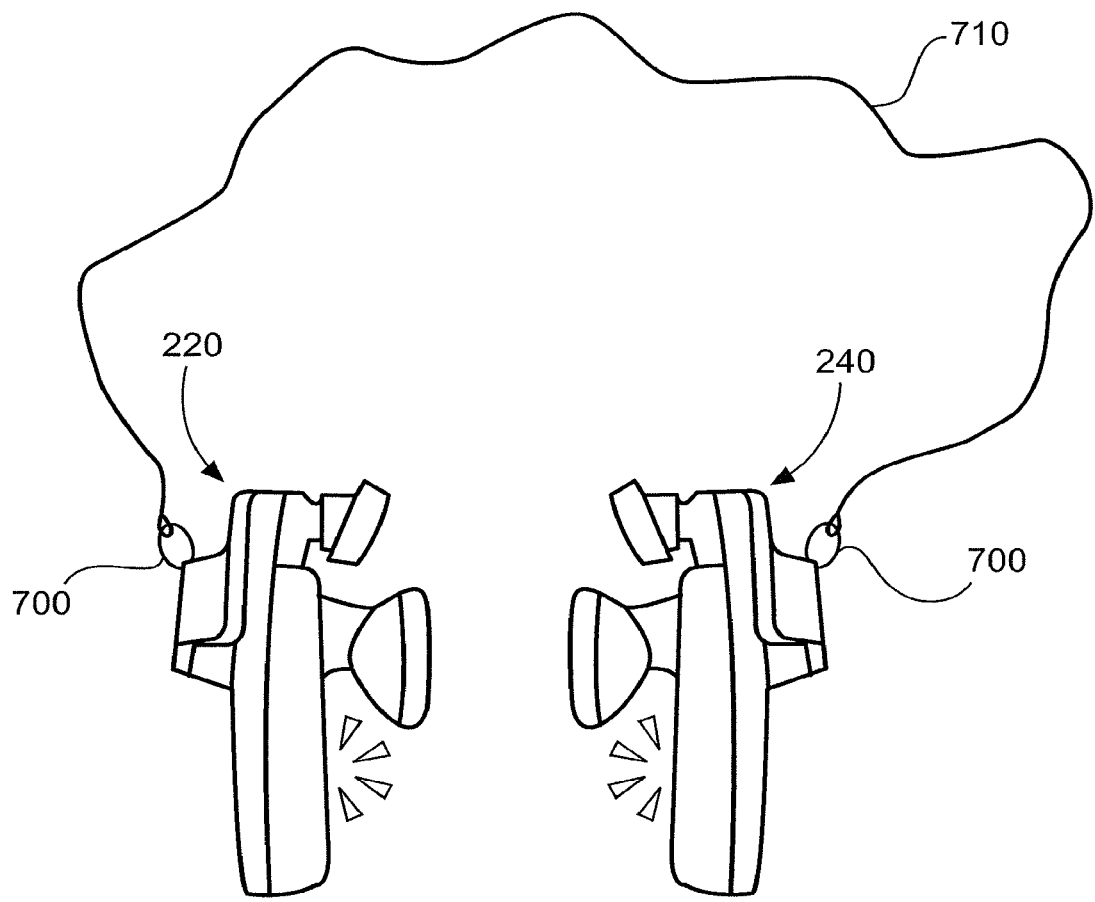
FIG. 15 shows diagrammatically an earphone according to the invention with an eye mounted thereto and a band drawn through the eye.

FIG. 15 shows a wireless earphone 220 with an eye 700 mounted thereto, through which a band or a thread can be easily drawn.

When two of the earphones 220, for example the left-hand and right hand earphones, have such an eye 700 and are connected by a band 710, that is advantageous for the user of the earphone as in that way he can easily hold the earphones together and does not lose them both if one of the earphones should drop out of the ear.

If desired a buckle or clasp or the like can also be provided on the band 710 to adjust the band length to the size desired by the user.

In the claims the words "have" and "include" do not exclude other elements or steps and the indefinite article "a" does not exclude a plurality.

A single unit or device can perform the function of a plurality of elements which are recited in the claims. The fact that individual functions and/or elements are recited in different appendant claims does not signify that it would not also be advantageously possible to use a combination of those functions and/or elements.

The reference numerals in the claims are not to be so interpreted that the subject-matter and the scope of protection of the claims is limited by those reference numerals.

The invention claimed is:

1. A container with integrated charging function configured to charge a pair of two chargeable wireless earphones, each of the two wireless earphones having an electrical earphone-charging contact, the container comprising:
   a container housing;
   two receiving units for at least partially receiving the two chargeable wireless earphones; a chargeable battery unit for storing electrical energy;
   a voltage input configured to couple the container to an electrical energy source;
   a charging unit for charging the two chargeable wireless earphones; and
   two electrical coupling contacts, each disposed on an interior portion of one of the two receiving units for connecting the two chargeable wireless earphones to the container;
   wherein each of the electrical coupling contacts cooperates in such a way with the electrical earphone-charging contact of one of the two chargeable wireless earphones that electrical energy can be transmitted into the two chargeable wireless earphones when the two chargeable wireless earphones are inserted into the two receiving units for charging purposes; and
   wherein the charging unit is configured for using the electrical energy stored in the chargeable battery unit for charging up the two chargeable wireless earphones when the container is not coupled to an electrical energy source so that the container enables a mobile charging of the two chargeable wireless earphones;
   wherein each receiving unit comprises a support surface on which a transducer housing of one of the wireless earphones rests when the wireless earphone is placed into one of the receiving units;
   wherein a shape of the support surface is adapted to a shape of the transducer housing.

2. The container according to claim 1;
   wherein the charging unit is configured for charging up both the chargeable battery unit and the two chargeable wireless earphones when the container is coupled to an electrical energy source.

3. The container according to claim 1, further comprising: a protective pouch.

4. The container according to claim 1;
wherein a first of the two receiving units is adapted to receive a first wireless earphone of the pair of wireless earphones; and
wherein a second of the two receiving units is adapted to receive a second wireless earphone of the pair of wireless earphones.

5. The container according to claim 1;
wherein the container with integrated charging function is a mobile charging and carrying case for charging the pair of two chargeable wireless earphones; and
wherein the two chargeable wireless earphones are in-ear earphones.

6. The container according to claim 1;
wherein the two chargeable wireless earphones are separate earphones that are not connected by a band.

7. A container with integrated charging function configured to charge a pair of two chargeable wireless earphones, each of the two wireless earphones having an electrical earphone-charging contact, the container comprising:
a container housing;
two receiving units for at least partially receiving the two chargeable wireless earphones; a chargeable battery unit for storing electrical energy;
a voltage input configured to couple the container to an electrical energy source;
a charging unit for charging the two chargeable wireless earphones; and
two electrical coupling contacts, each of the two electrical coupling contacts being disposed on an interior portion of one of the two receiving units for connecting the two chargeable wireless earphones to the container;
wherein each of the electrical coupling contacts cooperates in such a way with the electrical earphone-charging contact of one of the two chargeable wireless earphones that electrical energy is transmitted into the two chargeable wireless earphones when the two chargeable wireless earphones are inserted into the two receiving units for charging purposes;
wherein the charging unit is configured for using the electrical energy stored in the chargeable battery unit for charging the two chargeable wireless earphones when the container is not coupled to an electrical energy source so that the container enables a mobile charging of the two chargeable wireless earphones; and
wherein the charging unit is configured for charging both the chargeable battery unit and the two chargeable wireless earphones when the container is coupled to an electrical energy source.

8. The container according to claim 7;
wherein the container with integrated charging function is a mobile charging and carrying case for charging the pair of two chargeable wireless earphones; and
wherein the two chargeable wireless earphones are in-ear earphones.

9. The container according to claim 7; wherein the two chargeable wireless earphones are separate earphones that are not connected by a band.

* * * * *

UNITED STATES PATENT AND TRADEMARK OFFICE
CERTIFICATE OF CORRECTION

Page 1 of 1

PATENT NO. : 11,223,223 B2
APPLICATION NO. : 16/415524
DATED : January 11, 2022
INVENTOR(S) : Armando Castillo et al.

It is certified that error appears in the above-identified patent and that said Letters Patent is hereby corrected as shown below:

In the Claims

Claim 5 should be numbered as Claim 6

Claim 6 should be numbered as Claim 8

Claim 7 should be numbered as Claim 5

Claim 8 should be renumbered as Claim 7 and please change "The container according to claim 7;" to read -- The container according to claim 5; --

Claim 9 please change "The container according to claim 7;" to read -- The container according to claim 5; --

Signed and Sealed this
Twenty-fourth Day of October, 2023

Katherine Kelly Vidal
*Director of the United States Patent and Trademark Office*